United States Patent
Yamaguchi et al.

(10) Patent No.: US 10,763,094 B2
(45) Date of Patent: Sep. 1, 2020

(54) ANALYZING APPARATUS

(71) Applicant: SHIMADZU CORPORATION, Kyoto-shi, Kyoto (JP)

(72) Inventors: Shinichi Yamaguchi, Kyoto (JP); Yoshikatsu Umemura, Mishima-gun (JP); Masahiro Ikegami, Kyoto (JP); Koji Tanaka, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 315 days.

(21) Appl. No.: 15/539,413

(22) PCT Filed: Dec. 25, 2014

(86) PCT No.: PCT/JP2014/084281
§ 371 (c)(1),
(2) Date: Oct. 27, 2017

(87) PCT Pub. No.: WO2016/103388
PCT Pub. Date: Jun. 30, 2016

(65) Prior Publication Data
US 2018/0218892 A1 Aug. 2, 2018

(51) Int. Cl.
*H01J 49/00* (2006.01)
*G01N 30/46* (2006.01)
(Continued)

(52) U.S. Cl.
CPC ........ *H01J 49/0036* (2013.01); *G01N 30/463* (2013.01); *G01N 30/72* (2013.01);
(Continued)

(58) Field of Classification Search
CPC ............... H01J 49/0036; H01J 49/0004; H01J 49/0009; G01N 30/463; G01N 30/72; G01N 30/8651; G01N 30/8658
See application file for complete search history.

(56) References Cited

U.S. PATENT DOCUMENTS

| 9,299,553 B2* | 3/2016 | Whitehouse ........ H01J 49/0431 |
| 2014/0326871 A1 | 11/2014 | Whitehouse et al. |
| 2017/0336370 A1* | 11/2017 | Noda ..................... G01N 30/86 |

FOREIGN PATENT DOCUMENTS

| JP | 2001-28252 A | 1/2001 |
| JP | 2009-25268 A | 2/2009 |
| JP | 2011-122822 A | 6/2011 |

OTHER PUBLICATIONS

BenchTOF, "High-performance time-of-flight mass spectrometry for gas chromatography," Markes International Ltd., accessed on Dec. 5, 2014, URL: http://www.labicom.cz/administrace/ckfinder/userfiles/files/BenchTOF_series_brochure.pdf.
(Continued)

*Primary Examiner* — Bryan Bui
(74) *Attorney, Agent, or Firm* — Sughrue Mion, PLLC

(57) ABSTRACT

For every acquisition of a set of mass spectrum data, a mass calibrator (determines the amount of mass discrepancy using the appearance position of a peak originating from an internal standard substance having a known m/z value, and performs a process for correcting the mass discrepancy. A mass calibration information collector (collects the amount of mass discrepancy or mass correction quantity for each set of mass spectrum data. After the completion of the measurement, a three-dimensional display information creator creates a three-dimensional graph showing the large number of collected mass correction quantities plotted in a three-dimensional space in which the retention time in a primary column and the retention time in a secondary column in a comprehensive two-dimensional LC unit are represented by two mutually orthogonal axes while the mass correction quantity is represented by the axis orthogonal to those two axes.

5 Claims, 4 Drawing Sheets

(51) Int. Cl.
*G01N 30/72* (2006.01)
*G01N 30/86* (2006.01)
(52) U.S. Cl.
CPC ..... *G01N 30/8651* (2013.01); *G01N 30/8658* (2013.01); *H01J 49/0004* (2013.01); *H01J 49/0009* (2013.01)

(56) References Cited

OTHER PUBLICATIONS

GCImage: GCxGC Software, GC Image LLC, accessed on Nov. 10, 2014, <URL: http://www.gcimage.com/gcxgc/index.html>.
A. Makarov et al., "Dynamic Range of Mass Accuracy in LTQ ORBITRAP Hybrid Mass Spectrometer," J. Am. Soc. Mass. Spectrom., vol. 17, No. 7, Jul. 2006, pp. 977-982.
International Preliminary Report on Patentability for PCT/JP2014/084281, dated Jun. 27, 2017.
Written Opinion of the International Searching Authority for PCT/JP2014/084281, dated Mar. 31, 2015 (PCT/ISA/237).
Communication dated Mar. 6, 2018, from the European Patent Office in counterpart European Application No. 14908995.5.
Jürgen Cox et al: "Software Lock Mass by Two-Dimensional Minimization of Peptide Mass Errors", Journal of the American Society for Mass Spectrometry, vol. 22, No. 8, Apr. 22, 2011, pp. 1373-1380, XP055454716, US, ISSN: 1044-0305, DOI: 10.1007/s13361-011-0142-8.

\* cited by examiner m/z 538 m/z 835

SUM OF
SIGNAL INTENSITIES

DIFFERENCE BETWEEN
SIGNAL INTENSITIES
(m/z 538 − m/z 835)

PRODUCT OF
SIGNAL INTENSITIES

QUOTIENT OF
SIGNAL INTENSITIES
(m/z 538 DIVIDED
BY m/z 835)

ANALYZING APPARATUS

TECHNICAL FIELD

The present invention relates to an analyzing device having a display function, and more specifically, to an analyzing device which is suitable for various devices, such as a comprehensive two-dimensional gas chromatograph, a comprehensive two-dimensional liquid chromatograph, a comprehensive two-dimensional gas chromatograph mass spectrometer or comprehensive two-dimensional liquid chromatograph mass spectrometer, which are combinations of the aforementioned chromatographs with a mass spectrometer, or an imaging mass spectrometer.

BACKGROUND ART

In a gas chromatograph mass spectrometer (GC-MS) or liquid chromatograph mass spectrometer (LC-MS) in which a mass spectrometer is used as the detector for a gas chromatograph (GC) or liquid chromatograph (LC), a measurement on a sample temporally separated into components by a column in the chromatograph is repeatedly performed in the mass spectrometer. For example, when a scan measurement over a predetermined range of mass-to-charge ratios m/z is performed in the mass spectrometer, a set of data showing a mass spectrum within the predetermined range of mass-to-charge ratios is obtained in each scan measurement. In a mass spectrum which is obtained when a sample containing a specific component has been introduced into the mass spectrometer, one or more peaks originating from that component appear. Accordingly, it is possible to identify an unknown component by analyzing the pattern of the peaks appearing on the mass spectrum, in addition to the elution time (i.e. retention time) of that component in the chromatograph.

There are various types of mass spectrometers, such as the quadrupole, time of flight, ion trap, or Fourier transform ion cyclotron resonance type. In any of those types, a mass discrepancy (the difference between measured and true mass-to-charge ratios) occurs due to various factors, such as a change in the ambient temperature. Normally, such a mass discrepancy is calculated based on the result of a measurement on a specific substance whose exact mass-to-charge ratio is previously known (e.g. a standard substance), and a correction is performed in the data processing so as to eliminate the calculated mass discrepancy. In a chromatograph mass spectrometer, it is often the case that the amount of mass discrepancy changes with the passage of time from the introduction of the sample into the chromatograph. When a high level of analysis accuracy is needed, such a mass discrepancy whose amount changes with the passage of time needs to be corrected in almost real time. A method for correcting such a mass discrepancy is described in Patent Literature 1, in which a mass spectrometric analysis is performed with an internal standard substance continuously added to the sample separated into components by the chromatograph, and the mass-to-charge ratio at which the internal standard substance is detected is used to correct the mass discrepancy.

Even when such a correction of the mass discrepancy is possible, a situation in which the mass discrepancy becomes extremely large in the middle of the measurement should not be considered as normal; in such a situation, it is likely that some problem has occurred. Accordingly, in some cases, it is desirable to observe the temporal change in the amount of mass discrepancy or in a mass correction quantity for correcting the mass discrepancy, so as to confirm or verify whether or not the measurement has been properly performed. For this purpose, a conventional device has been known which can display the relationship between the retention time and the mass correction quantity in a graphical form, for example, as shown in FIG. 4 (see FIG. 4 in Non Patent Literature 1, page 9 of Non Patent Literature 2, or other documents). Such a graph allows analysis operators to instantly comprehend whether or not the mass correction quantity has reached or even exceeded a specific value in the middle of the measurement. This is convenient for checking the reliability of the measurement.

As one technique of the GC analysis, a technique called the "comprehensive two-dimensional GC" or "GC×GC" has been commonly known (see Patent Literature 2 or other documents). In the comprehensive two-dimensional GC, various components contained in a target sample are initially separated by a column which is the first dimension (which is hereinafter called the "primary column"), and the thereby eluted components are introduced into a modulator. The modulator repeats an operation including the steps of capturing the introduced components at regular intervals of modulation time (which is normally within a range from a few seconds to approximately one dozen seconds), detaching those components with an extremely narrow time bandwidth, and introducing them into a column which is the second dimension (which is hereinafter called the "secondary column"). The component separation in the primary column is normally performed under such a separation condition that the elution occurs at a rate approximately equal to or slightly lower than the rate in a commonly used GC. On the other hand, as compared to the primary column, the column used as the secondary column has a different polarity, shorter length and smaller inner diameter, with the component separation performed under such a condition that each elution will be completed within the specified modulation time. In this manner, in the comprehensive two-dimensional GC, a plurality of components which have not been separated by the primary column and whose peaks overlap each other can be separated in the secondary column, whereby the separation performance is dramatically improved as compared to normal GCs.

A similar technique to the comprehensive two-dimensional GC is also known in the field of LC analysis, which uses two columns having different separation characteristics and is called the "comprehensive two-dimensional LC" or "LC×LC". In the present description, both the comprehensive two-dimensional GC and the comprehensive two-dimensional LC are collectively called the "comprehensive two-dimensional chromatograph".

In those comprehensive two-dimensional chromatographs, the retention time in the secondary column ("second retention time RT2") is an enlargement of a narrow range of time in the retention time in the primary column ("primary retention time RT1"). Therefore, the measured result may be represented by a chromatogram similar to the normal one. However, in many cases, using a one-dimensional chromatogram makes it difficult to comprehend the state of separation in each individual column, since the two columns have different separation characteristics. Therefore, in order to present the state of separation in each column in an easily comprehensible form, a two-dimensional chromatogram having two orthogonal axes which respectively represent the primary retention time RT1 and the secondary retention time RT2 is created, with the signal intensity represented by contour lines, color scale, or gray scale. A commonly known data processing software product for creating two-dimensional chromatograms is "GC Image", offered by GC Image LLC (see Non Patent Literature 3).

In recent years, mass spectrometers have been popularly used as detectors for comprehensive two-dimensional GCs or LCs. In such a comprehensive two-dimensional chromatograph mass spectrometer, if the correction of the mass discrepancy is performed in substantially real time, it is certainly possible to draw the relationship between the retention tine and the amount of mass discrepancy or mass correction quantity as shown in FIG. 4. However, if the mass discrepancy information is displayed as shown in FIG. 4, users cannot easily comprehend the relationship between the retention time and the mass discrepancy for each of the two independent columns, since, in many cases, the two columns used in a comprehensive two-dimensional chromatograph have different separation characteristics, as noted earlier. Such a problem is not unique to the mass discrepancy information; for example, a similar problem occurs with a retention-time discrepancy (i.e. the discrepancy between measured and true retention times) in a chromatograph.

Besides, in an imaging mass spectrometer frequently used for a measurement of biological samples, as disclosed in Patent Literature 3, a mass spectrum or $MS^n$ spectrum can be obtained for each of a large number of micro areas within a two-dimensional area on a sample. Based on the measured results, a mapping image which shows the distribution of the signal intensity at a specific mass-to-charge ratio corresponding to the two-dimensional area to be analyzed can be created. For example, such a device sequentially performs a mass spectrometric analysis for each of the large number of micro areas while gradually changing the position of the sample. Therefore, a considerable amount of time is needed from the beginning to the end of the measurement for one sample. During this period of time, a change in the amount of mass discrepancy may possibly occur. However, none of the conventional imaging mass spectrometers have been provided with the function of displaying, in an easily comprehensible form, the amount of mass discrepancy or mass correction quantity in a mass spectrometric analysis at each micro area.

Furthermore, no conventional comprehensive two-dimensional chromatograph or imaging mass spectrometer has the function of displaying, in an intuitively comprehensible form for analysis operators, such kinds of information as a difference between analysis results obtained for a plurality of samples, difference between analysis results obtained for different components in one sample, difference in various physical or statistical quantities respectively calculated from the analysis results obtained for a plurality of samples, or difference in various physical or statistical quantities respectively calculated from the analysis results obtained for different components in one sample.

CITATION LIST

Patent Literature

Patent Literature 1: JP 2001-28252 A
Patent Literature 2: JP 2011-122822 A
Patent Literature 3: JP 2009-25268 A Non Patent Literature Non Patent Literature 1: Alexsander Makarov and three other authors, "Dynamic Range of Mass Accuracy in LTQ Orbitrap Hybrid Mass Spectrometer", J. Am. Soc. Mass Spectrom., Vol. 17, 7, July 2006, pp. 977-982, the Internet Non Patent Literature 2: "BenchTOF", Markes International Ltd, [accessed on Dec. 5, 2014], the Internet Non Patent Literature 3: "GC Image: GCxGC Software", [online], GC Image LLC, [accessed on Nov. 10, 2014], the Internet

SUMMARY OF INVENTION

Technical Problem

The present invention has been developed in view of the previously described problems. Its primary objective is to provide an analyzing device, such as a comprehensive two-dimensional chromatograph mass spectrometer or imaging mass spectrometer, capable of presenting analysis operators, in an easily understandable form, a temporal change in a process-related parameter, such as various error quantities which occur in a measurement (e.g. mass discrepancy or retention-time discrepancy) or a correction quantity for correcting such errors, or a spatial distribution of such a parameter.

Another objective of the present invention is to provide an analyzing device, such as a comprehensive two-dimensional chromatograph mass spectrometer or imaging mass spectrometer, capable of presenting analysis operators, in an easily understandable form, such kinds of information as a difference between analysis results obtained for a plurality of samples, difference between analysis results obtained for different components in one sample, difference in various physical or statistical quantities respectively calculated from the analysis results obtained for a plurality of samples, or difference in various physical or statistical quantities respectively calculated from the analysis results obtained for different components in one sample.

Solution to Problem

The first aspect of the present invention developed for solving the previously described problems is an analyzing device for obtaining, for one sample, signal intensity values as analysis data by performing an analysis on each of micro areas on an N-dimensional space which is either a virtual space or a real space (where N is an integer equal to or greater than two), including:

a) an error information collector for collecting, during an execution of an analysis at each of the micro areas, an error quantity related to an analysis or correction information for correcting the error quantity; and b) a graph creator for creating a graph showing a distribution based on the error quantity or correction information at each micro area collected by the error information collector, within an N+1 dimensional space formed by adding an axis representing the error quantity or correction information to the N axes forming the N-dimensional space, and for displaying the graph on a screen of a display unit.

The "correction information" may be the correction quantity directly used for correcting an error, or it may be a coefficient in a correction equation for correcting an error.

If the analyzing device according to the present invention is either a comprehensive two-dimensional GC or comprehensive two-dimensional LC using a mass spectrometer as the detector, the two axes of the two-dimensional space with N having a value of 2 both represent retention times. In this case, the error quantity may be the mass discrepancy in the mass spectrometer or the retention-time discrepancy in the comprehensive two-dimensional GC or comprehensive two-dimensional LC. For example, the mass discrepancy can be determined based on the result of a mass spectrometric analysis performed on an internal standard substance (whose exact mass-to-charge ratio is previously known) added to a sample after the separation by the chromatograph. On the other hand, the retention-time discrepancy can be determined, for example, based on the result of a mass spectrometric analysis performed on an internal standard substance (whose exact retention time is previously known) added to a sample before the separation by the chromatograph, with the flow velocity of the mobile phase and/or other parameters additionally taken into account. In these cases, the two-dimensional space is a virtual space.

If the analyzing device according to the present invention is an imaging mass spectrometer, the two axes of the two-dimensional space with N having a value of 2 may be position information in different directions on a sample. Needless to say, the two-dimensional space in the present case is a real space. The error quantity is the mass discrepancy in the mass spectrometer.

If the analyzing device according to the present invention is a comprehensive two-dimensional GC or comprehensive two-dimensional LC using a mass spectrometer as the detector, and if the error quantity is the mass discrepancy, the error information collector collects the amount of mass discrepancy or correction information for each combination of the retention time in the primary column and the retention time in the secondary column. As described earlier, the mass discrepancy can be calculated based on the result of a mass spectrometric detection of an internal standard substance continuously added to a sample introduced into the mass spectrometer. After the two-dimensional distribution of the amount of mass discrepancy is thus obtained in the error information collector, the graph creator creates a graph representing the distribution of the amount of mass discrepancy in a three-dimensional space with the two retention times and the amount of mass discrepancy as the three axes, and displays the graph on the screen of a display unit. This graph may consist of simple points showing the amount of mass discrepancy plotted against the combination of the retention times in the three-dimensional space. A virtual curved surface on which those plot points are present may also be created and drawn in the three-dimensional space.

Such a display allows analysis operators to intuitively comprehend a temporal change or spatial distribution of the amount of mass discrepancy, retention-time discrepancy or the like and easily check, for example, whether or not an abnormal situation has occurred in the middle of the measurement.

The graph displayed on the display screen should preferably be rotatable by an arbitrary angle around any axis according to an appropriate operation by an analysis operator. This allows analysis operators to observe the distribution of the error quantity or correction information from an arbitrary direction and easily check, for example, whether or not the mass discrepancy is within a predetermined range.

When the graph is displayed, the display mode of the plot points or surfaces, and typically, their display color may be varied so that an error quantity or correction information which has deviated from a predetermined value range can be distinguished from the other ones.

In the analyzing device according to the first aspect of the present invention, a distribution of an error quantity or correction information is represented by a graph whose number of dimensions is equal to or greater than three. Alternatively, the result of a comparison of the signal intensity values obtained by an analysis, or a quantity or value calculated from the signal intensities, may be displayed in a similar graphical form.

Thus, the second aspect of the present invention developed for solving the previously described problem is an analyzing device for obtaining, for a sample, signal intensity values as data by performing an analysis on each of micro areas on an N-dimensional space which is either a virtual space or a real space (where N is an integer equal to or greater than two), including:

a) a difference information acquirer for calculating, for a plurality of samples or for a plurality of components in one sample, difference information for each of the micro areas, the difference information showing a difference in the signal intensity value obtained by the analysis at each of the micro areas or a difference in a physical quantity or statistical quantity obtained from the signal intensity values by a predetermined computation; and b) a graph creator for creating a graph showing a distribution based on the difference information calculated for each micro area by the difference information acquirer, within an N+1 dimensional space formed by adding an axis representing the difference information to the N axes forming the N-dimensional space, and for displaying the graph on a screen of a display unit.

The "difference information" may be any information which allows for a comparison of two signal intensity values, physical quantities, statistical quantities or the like. It does not always need to be a simple difference, but may be a ratio.

In the case where the analyzing device according to the present invention is a comprehensive two-dimensional GC or comprehensive two-dimensional LC using a mass spectrometer as the detector, or in the case where it is an imaging mass spectrometer, the signal intensity values obtained by the analysis at each of the micro areas for a plurality of samples are, for example, signal intensity values at a specific mass-to-charge ratio or accumulated values of the signal intensity values over the entire range of mass-to-charge ratios (total ion current value). On the other hand, in the aforementioned cases, the signal intensity values obtained by the analysis at each of the micro areas for a plurality of components in one sample are, for example, signal intensity values at mass-to-charge ratios which respectively correspond to different component.

The physical quantity obtained from signal intensity values by a predetermined computation is, for example, the concentration or content of a component. The statistical quantity obtained from signal intensity values by a predetermined computation is, for example, a test quantity, or a coordinate position or distance in a statistical space.

If the analyzing device according to the present invention is a comprehensive two-dimensional GC or comprehensive two-dimensional LC using a mass spectrometer as the detector, the difference information acquirer acquires, for example, signal intensity values at a specific mass-to-charge ratio of interest in mass spectrum data repeatedly obtained with the passage of time for two samples, and calculates the difference in that signal intensity value between the two samples at each retention time. After the two-dimensional distribution of the amount of difference in the signal intensity value is thus obtained in the difference information acquirer, the graph creator creates a graph showing the distribution of the amount of difference in a three-dimensional space with the two retention times and the amount of difference as the three axes, and displays the graph on the screen of a display unit. This graph may consist of simple points showing the amount of difference plotted against the combination of the retention times in the three-dimensional space. A virtual curved surface on which those plot points are present may also be created and drawn within the three-dimensional space.

Such a display allows analysis operators to intuitively comprehend a temporal change or spatial distribution of the difference in the signal intensity value between two samples or similar value.

Advantageous Effects of the Invention

The analyzing device according to the first aspect of the present invention, such as a comprehensive two-dimensional chromatograph mass spectrometer or imaging mass spectrometer, is capable of presenting analysis operators, in an easily understandable form, a temporal change in a process-related parameter, such as various error quantities which occur in a measurement (e.g. mass discrepancy or retention-time discrepancy) or a correction quantity for correcting such errors, or a spatial distribution of such a parameter. Therefore, for example, analysis operators can instantly comprehend whether or not the measurement has been properly performed.

The analyzing device according to the second aspect of the present invention, such as a comprehensive two-dimensional chromatograph mass spectrometer or imaging mass spectrometer, is capable of presenting analysis operators, in an easily understandable form, such kinds of information as a difference between analysis results obtained for a plurality of samples, difference between analysis results obtained for different components in one sample, difference in various physical or statistical quantities respectively calculated from the analysis results obtained for a plurality of samples, or difference in various physical or statistical quantities respectively calculated from the analysis results obtained for different components in one sample.

DESCRIPTION OF EMBODIMENTS

A comprehensive two-dimensional LC-MS system as the first embodiment of the present invention is hereinafter described with reference to the attached drawings.

Figure 1:
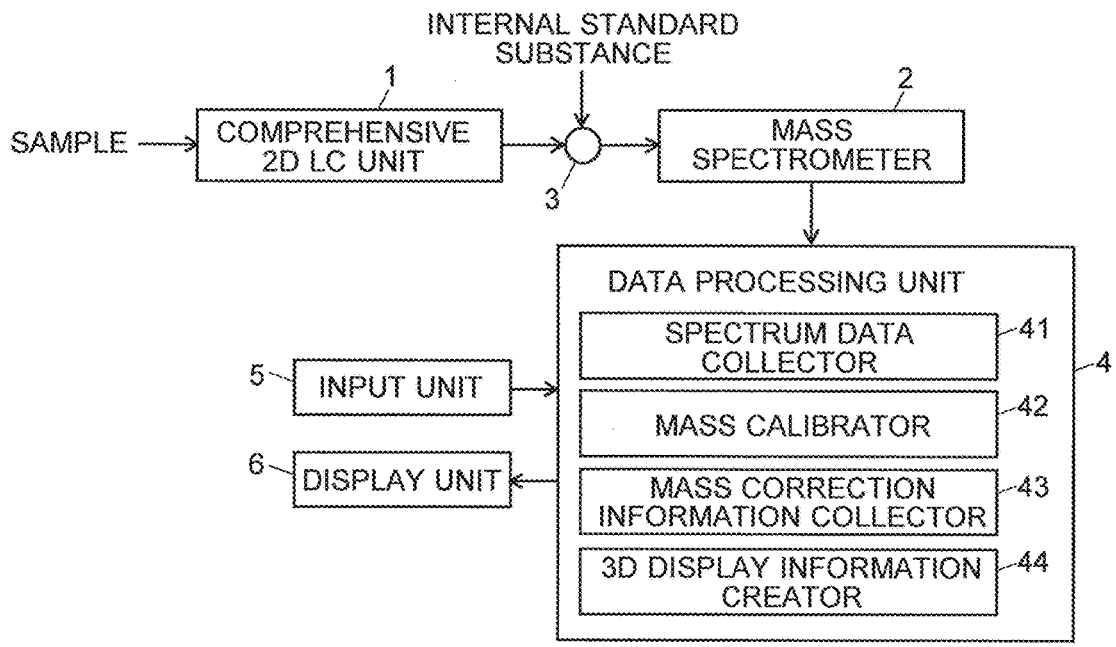
FIG. 1 is a schematic configuration diagram of a comprehensive two-dimensional LC-MS system as one embodiment (first embodiment) of the present invention.

FIG. 1 is a schematic configuration diagram of the comprehensive two-dimensional LC-MS system in the first embodiment.

The comprehensive two-dimensional LC-MS system in the first embodiment includes a comprehensive two-dimensional LC unit 1, mass spectrometer 2, internal standard substance adder 3, data processing unit 4, input unit 5 and display unit 6.

The data processing unit 4 includes a spectrum data collector 41, mass calibrator 42, mass calibration information collector 43, and three-dimensional display information creator 44 as its functional blocks in order to perform characteristic processes which will be described later.

The data processing unit 4 can be constructed using a personal computer as a hardware resource, with each of its functions realized by executing, on the personal computer, a dedicated processing software program previously installed on the same computer.

Though not shown, the comprehensive two-dimensional LC unit 1 includes: a pump for supplying a mobile phase; an injector for injecting a sample into the mobile phase: a primary column; a modulator for capturing components eluted from the exit port of the primary column at regular intervals of modulation time and sending those components in a temporally compressed form; and a secondary column having a different separation characteristic (typically, a different polarity) from that of the primary column and being capable of high-speed separation. The various components contained in the sample injected from the injector into the mobile phase supplied to the primary column at a constant flow rate by the action of the pump are temporally separated and eluted with a high level of resolving power by the two-stage column consisting of the primary and secondary columns. This eluate is continuously introduced via the internal standard substance adder 3 into the mass spectrometer 2.

In the internal standard substance adder 3, a standard substance whose exact mass-to-charge-ratio value is previously known and whose non-existence in the target sample is unmistakable is continuously added to the eluate at a predetermined rate. Accordingly, the sample introduced into the mass spectrometer 2 contains the internal standard substance in addition to the components originally contained in the eluate from the comprehensive two-dimensional LC unit 1. The internal standard substance may be a single kind of substance. In some cases, it is preferable to use a plurality of standard substances having different mass-to-charge ratios, since the mass discrepancy at low mass-to-charge ratios may differ from the mass discrepancy at high mass-to-charge ratios.

An example of the mass spectrometer 2 is a quadrupole mass spectrometer provided with an atmospheric pressure ion source employing an electrospray ionization (ESI) or similar method. However, the mass spectrometer 2 is not limited to this example; it may be replaced by a mass spectrometer having a different configuration, such as a Q-TOF mass spectrometer or ion-trap time-of-flight mass spectrometer.

In the mass spectrometer 2, the components in the introduced sample are sequentially ionized in the atmospheric pressure ion source. The thereby generated ions are introduced into the quadrupole mass filter. Only ions having a specific mass-to-charge ratio pass through this quadrupole mass filter, to eventually reach and be detected by an ion detector. In the present example, the quadrupole mass filter is driven by a controller (not shown) so that a scan measurement over a predetermined mass-to-charge-ratio range is repeated. The spectrum data collector 41 in the data processing unit 4 repeatedly collects mass spectrum data showing the ion intensity over the predetermined mass-to-charge-ratio range, from the beginning to the end of the analysis.

Figure 2A:
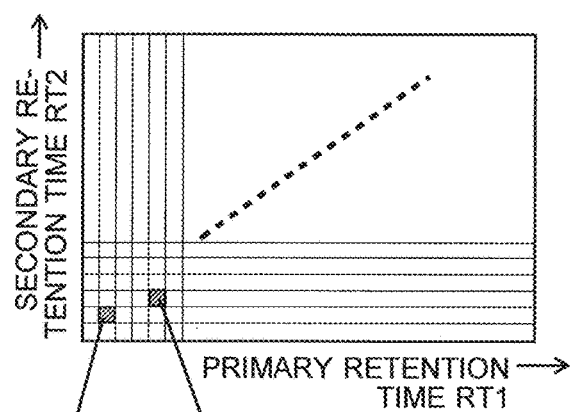
FIGS. 2A and 2B are schematic diagrams of data obtained by a measurement in the comprehensive two-dimensional LC-MS system in the first embodiment.
Figure 2B:
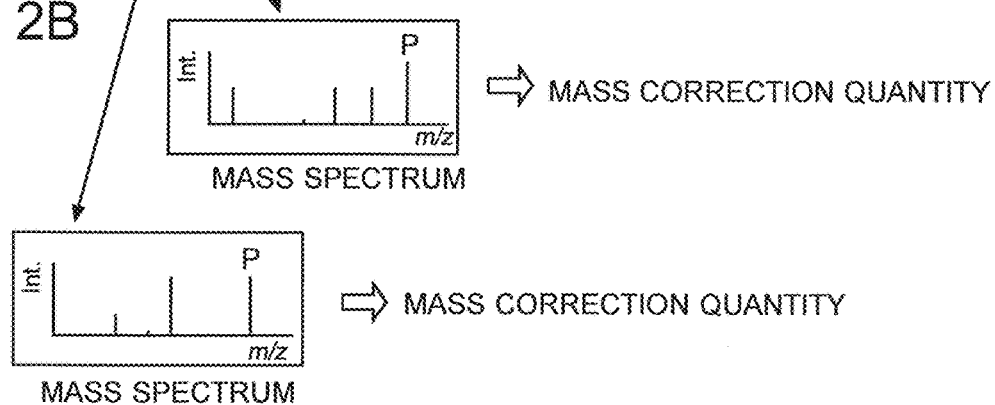

FIGS. 2A and 2B are schematic diagrams of mass spectrum data obtained by a measurement in the comprehensive two-dimensional LC-MS system in the first embodiment.

As described earlier, the various components contained in a sample are temporally separated with a high level of resolving power in the comprehensive two-dimensional LC unit 1, while a scan measurement is repeatedly performed by the mass spectrometer 2. As a result, as shown in FIGS. 2A and 2B, mass spectrum data corresponding to each micro area (or each "pixel" which is a rectangular area as indicated by hatched lines in FIG. 2A) on a virtual space having the two time axes of the primary retention time RT1 and secondary retention time RT2 are stored in the spectrum data collector 41. Mass spectrum data at one micro area are a set of data which constitute a mass spectrum showing the relationship between the mass-to-charge ratio m/z and the ion intensity, as shown in FIG. 2B.

As described earlier, the target of the mass spectrometric analysis always contains the internal standard substance. Therefore, the mass spectrum obtained in each scan measurement always includes a peak P which originates from the internal standard substance. If a discrepancy in the measured mass-to-charge ratios occurs due to some factor, the discrepancy also occurs in the position at which the peak P originating from the internal standard substance appears on the mass spectrum. The difference between this appearance position (i.e. the apparent mass-to-charge-ratio value) and the previously known, true mass-to-charge-ratio value is the amount of mass discrepancy. Accordingly, for every acquisition of the mass spectrum, the mass calibrator 42 in the data processing unit 4 detects the appearance position of the peak P originating from the internal standard substance and calculates the amount of mass discrepancy using the detection result. Specifically, for example, a window which covers a predetermined range is defined, with the known mass-to-charge-ratio value of the internal standard substance at its center. If a peak whose intensity is equal to or higher than a predetermined level has been observed within that window on the obtained mass spectrum, that peak can be considered to be the peak originating from the internal standard substance. After the amount of mass discrepancy is calculated, the mass-to-charge-ratio axis of the mass spectrum is corrected by that amount to obtain a mass spectrum with no (or a smaller amount of) mass discrepancy.

The mass calibration information collector 43 collects and stores the "mass correction quantity", i.e. the amount of mass discrepancy obtained for each mass spectrum (i.e. for each pixel on the two-dimensional chromatogram) in the mass calibrator 42 in the previously described manner. Thus, the same number of amounts of mass discrepancy as the total number of pixels on the two-dimensional chromatogram are obtained. After the completion of the measurement, upon receiving a predetermined input from the input unit 5, the three-dimensional display information creator 44 creates a graphical image which shows the two-dimensional distribution of the mass correction quantity, by plotting the values of the mass correction quantity stored in the mass calibration information collector 43, within the three-dimensional display space in which the primary and secondary retention times RT1 and RT2 are represented by two mutually orthogonal axes while the mass correction quantity is represented by the axis orthogonal to those two axes. The created three-dimensional display image is shown on the screen of the display unit 6.

Figure 3A:
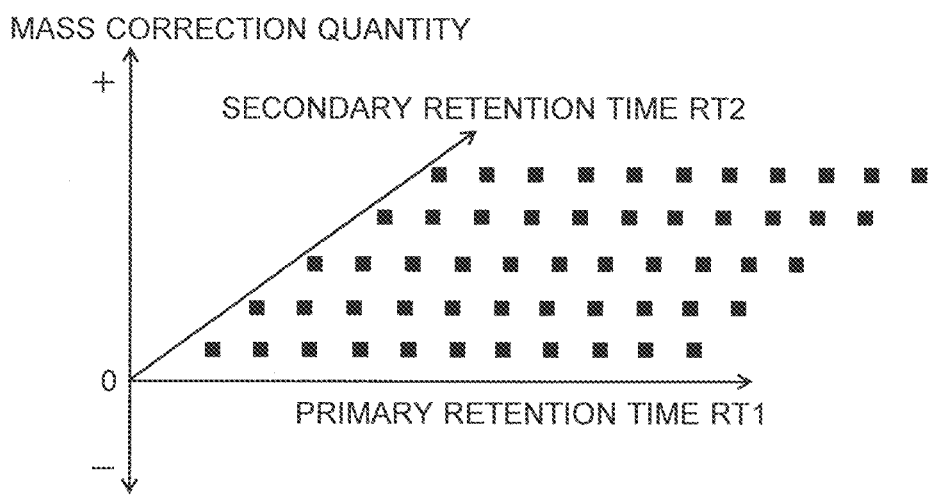
FIGS. 3A and 3B show examples of the three-dimensional display of a mass correction quantity in the comprehensive two-dimensional LC-MS system in the first embodiment.
Figure 3B:
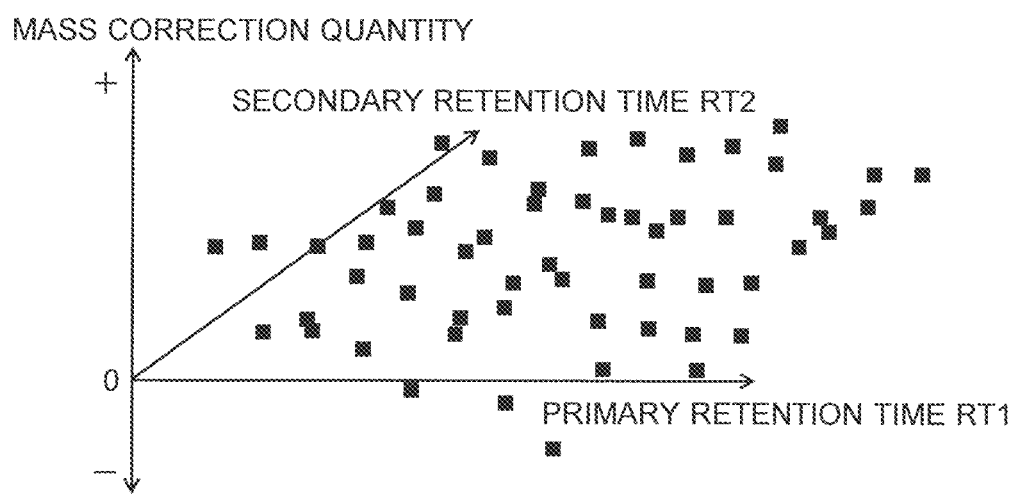
Figure 4:
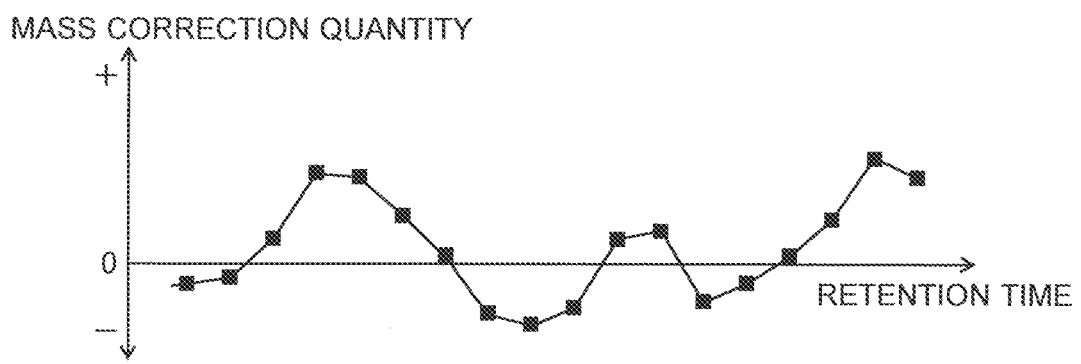
FIG. 4 is a graph showing one example of the conventional display of the mass correction quantity.

FIGS. 3A and 3B show examples of the three-dimensional display image. Specifically, FIG. 3A shows an example of the display image obtained when the mass correction quantity is zero at all pixels, i.e. when there is no mass discrepancy. In this case, all plot points are present on the plane which contains the two axes of the primary and secondary retention times RT1 and RT2. On the other hand, FIG. 3B shows an example of the display image obtained when a mass discrepancy is present at each pixel. By viewing such a display, analysis operators can intuitively comprehend the two-dimensional distribution of the amount of mass discrepancy.

In FIGS. 3A and 3B, the values of the mass correction quantity are simply represented by plot points. Needless to say, a smoothly curved surface on which the large number of plot points are present may be calculated and displayed with the plot points. This provides a clearer view of the unevenness of those values.

The three-dimensional display image as shown in FIG. 3A or 3B should preferably be made rotatable around each axis by an arbitrary angle so that the image can be viewed from any direction. For example, this allows the distribution of the amount of mass discrepancy to be viewed with the secondary retention time RT2 orthogonally directed to the plane of paper so that the value of the primary retention time RT1 at which the largest amount of mass discrepancy is present can be instantly recognized.

The previously described embodiment has been concerned with the display of a two-dimensional distribution of the amount of discrepancy of the mass-to-charge ratio. Similarly, a two-dimensional distribution of the amount of discrepancy of the retention time in each of the primary and secondary columns, or that of the correction quantity of the retention-time discrepancy, may also be displayed. The retention-time discrepancy can be determined by using the points in time at which a plurality of internal standard substances whose correct retention times are previously known are respectively detected in a mass spectrometric analysis of an eluate obtained by separating a sample into components by the comprehensive two-dimensional LC unit 1 after adding those internal standard substances to the sample. In this case, the retention-time discrepancy within the period of time between the point in time at which one internal standard substance is detected and the point in time at which the next internal standard substance is detected may be determined based on a calculating formula which uses the retention-time discrepancies at those two points in time.

Although the previous embodiment is concerned with a comprehensive two-dimensional LC-MS system, the same display can also be similarly made in a comprehensive two-dimensional GC-MS system.

Furthermore, a similar two-dimensional display of the amount of mass discrepancy can also be performed in an imaging mass spectrometer as well as in a comprehensive two-dimensional chromatograph mass spectrometer.

In the case of the imaging mass spectrometer, mass spectrum data are obtained by performing a mass spectrometric analysis on each of the two-dimensionally arrayed micro areas formed by finely dividing a two-dimensional area. Accordingly, one set of mass spectrum data is obtained for each pixel within the two-dimensional area, as shown in FIG. 2A, where, for the present case, the retention times should be read as the position on the sample. Normal types of imaging mass spectrometers perform the mass spectrometric analysis pixel by pixel while gradually changing the relative position of the mass spectrometry section and the sample. Therefore, a considerable amount of time is needed to obtain the result of the mass spectrometric analysis for the entire two-dimensional area. During this process, the amount of mass discrepancy may change. To deal with this situation, an internal standard substance (e.g. a matrix used in MALDI) which is almost evenly added to all pixels can be used as the reference for the mass discrepancy detection, to calculate the amount of mass discrepancy from the mass spectrum obtained for each pixel. By using the calculated amounts of mass discrepancy, a three-dimensional display image showing the amounts of mass discrepancy as shown in FIG. 3A or 3B can be created.

Figure 5:
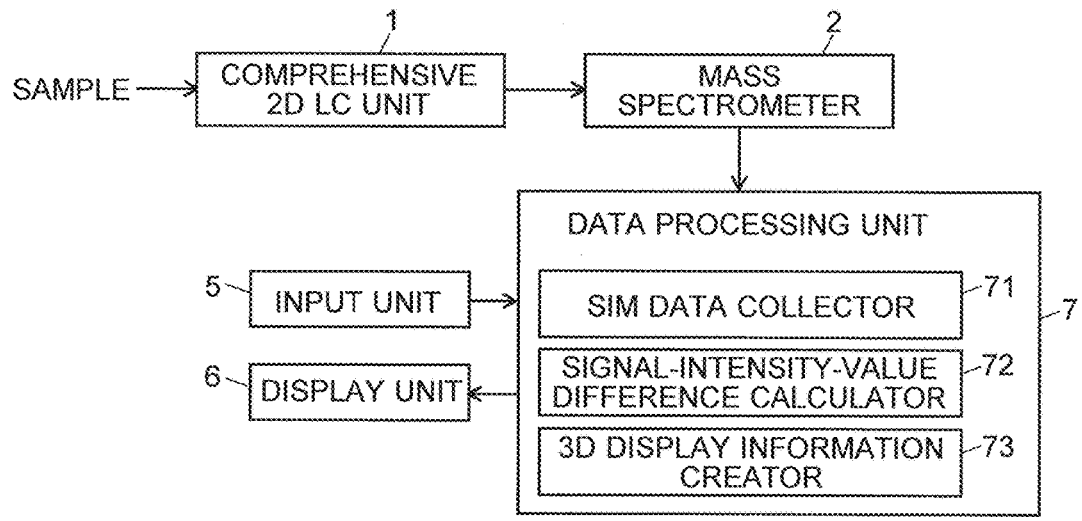
FIG. 5 is a schematic configuration diagram of a comprehensive two-dimensional LC-MS system as another embodiment (second embodiment) of the present invention.
Figure 6:
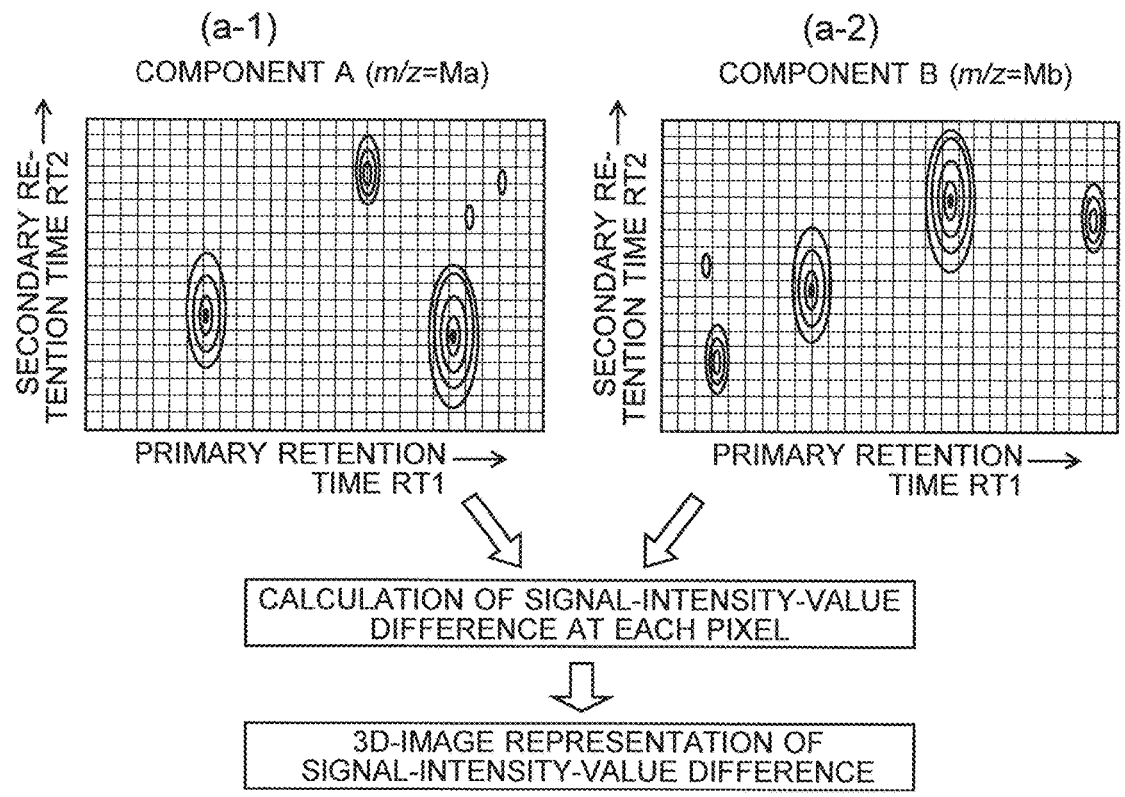
FIG. 6 is an illustration of the process for displaying a signal-intensity-value difference in the comprehensive two-dimensional LC-MS system in the second embodiment.

A comprehensive two-dimensional LC-MS system as the second embodiment of the present invention is hereinafter described with reference to FIGS. 5 and 6. FIG. 5 is a schematic configuration diagram of the comprehensive two-dimensional LC-MS system in the second embodiment. FIG. 6 is an illustration of the process of displaying the signal-intensity-value difference in the comprehensive two-dimensional LC-MS system in the second embodiment. Unlike the first embodiment which is concerned with the three-dimensional display of a two-dimensional distribution of an error quantity which occurs during an analysis or that of correction information for correcting the error quantity, the second embodiment is concerned with the three-dimensional display of a two-dimensional distribution of the result of a comparison of the signal intensity values obtained as analysis results.

In FIG. 5, the same components as already mentioned in the first embodiment are denoted by the same numerals. In the comprehensive two-dimensional LC-MS system in the second embodiment, the data processing unit 7 includes an SIM data collector 71, signal-intensity-value difference calculator 72 and three-dimensional display information creator 73 as its functional blocks. The following description takes an example of the case where the target of observation is the amount of difference between the signal intensity values detected for a plurality of known components contained in a sample of interest.

In the mass spectrometer 2, each of the mass-to-charge ratios corresponding to the plurality of components is monitored in a SIM (selected ion monitoring) measurement mode over the entire measurement period. It is hereinafter assumed that there are two components A and B as the plurality of components. The mass-to-charge ratio m/z corresponding to component A is Ma. and the mass-to-charge ratio m/z corresponding to component B is Mb. In the comprehensive two-dimensional LC unit 1, the sample is injected from the injector into the mobile phase. The eluate from the two-stage column consisting of the primary and secondary columns is introduced into the mass spectrometer 2. By repeatedly performing the SIM measurements in the mass spectrometer 2, signal intensity value data obtained at m/z=Ma and m/z=Mb at each retention time are stored in the SIM data collector 71. Based on the signal intensity value data obtained at m/z=Ma at each retention time, a two-dimensional chromatogram (mass chromatogram) can be created, for example, as shown in chart (a-1) in FIG. 6. Similarly, based on the signal intensity value data obtained at m/z=Mb at each retention time, another two-dimensional chromatogram can be created, for example, as shown in chart (a-2) in FIG. 6.

The signal-intensity-value difference calculator 72 calculates the difference between the signal intensity values obtained at each pixel on the two-dimensional chromatograms which respectively correspond to components A and B, and stores the calculated values. Thus, the same number of signal-intensity-value differences as the total number of pixels are obtained. After the completion of the measurement, upon receiving a predetermined input from the input unit 5, the three-dimensional display information creator 73 creates a graphical image which shows a two-dimensional distribution of the signal-intensity-value difference, by plotting the values of the signal-intensity-value difference stored in the signal-intensity-value difference calculator 72, within the three-dimensional display space in which the primary and secondary retention times RT1 and RT2 are represented by two mutually orthogonal axes while the amount of signal-intensity-value difference is represented by the axis orthogonal to those two axes. The created three-dimensional display image is shown on the screen of the display unit 6. In this manner, the relationship between the difference in the signal intensity value detected for two components and the retention times in the two columns can be visually displayed.

Other than the difference or ratio between the signal intensity values detected for two components, various kinds of information can be similarly displayed in a three-dimensional form. For example, the difference or ratio between the total ion intensity values (accumulated values of the signal intensity values over the entire range of mass-to-charge ratios) respectively obtained for different samples can also be displayed in a similar manner. Various values calculated from the signal intensity values obtained by a mass spectrometric analysis can also be similarly displayed in place of the direct values of the signal intensity. For example, in mass spectrometric analyses, the concentrations or contents (absolute quantities) of components are calculated from signal intensity values with the help of a previously determined calibration curve or similar information. The difference or ratio between those concentration values or contents can also be displayed in a three-dimensional form. Furthermore, the difference or ratio between statistical quantities obtained by performing a statistical computation on the signal intensity values, concentration values, contents or the like according to a predetermined algorithm may also be displayed in a three-dimensional form. Possible examples of the statistical quantity include a test quantity, a coordinate position or distance within a statistical space, and so on.

As with the first embodiment, the display system in the second embodiment can also be similarly applied in an imaging mass spectrometer. That is to say, two-dimensional chromatograms as shown in chart (a-1) or (a-2) in FIG. 6 correspond to imaging graphics at specific mass-to-charge ratios in an imaging mass spectrometer. Accordingly, for example, for a plurality of imaging graphics obtained for one sample at different mass-to-charge ratios, a graphic image which shows the result of a computation performed on those imaging graphics can be obtained by calculating the sum, difference, product or quotient of the signal intensity values obtained at each pixel in those imaging graphics (i.e. by performing addition, subtraction, multiplication or division).

Figure 7A:
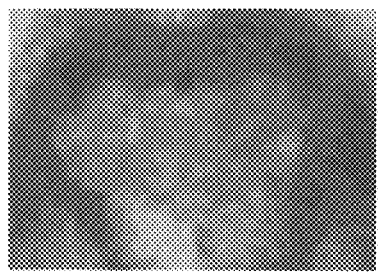
FIGS. 7A-7F show examples of imaging graphics obtained by applying the system of the second embodiment in an imaging mass spectrometer.
Figure 7B:
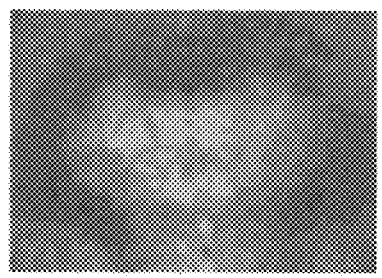
Figure 7C:
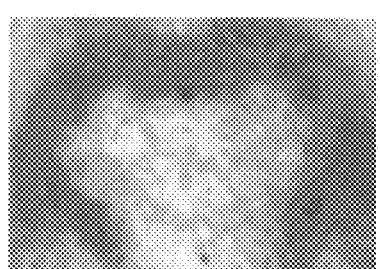
Figure 7D:
Figure 7E:
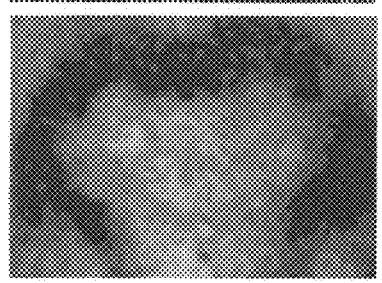
Figure 7F:
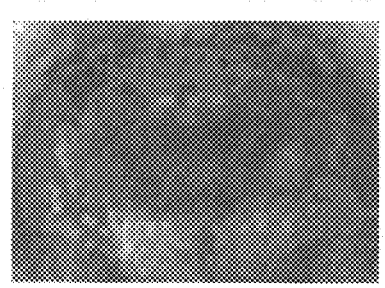

FIGS. 7A-7F show examples of such imaging graphics. FIGS. 7A and 7B are imaging graphics at m/z 538 and m-z 835 actually obtained based on the data obtained by an imaging mass spectrometric analysis. From these imaging graphics, new imaging graphics as shown in FIGS. 7C-7F have been created based on the results obtained by performing the addition, subtraction, multiplication and division of the signal intensity values at each pixel. From such imaging graphics, analysis operators can estimate the degree of difference or similarity in the two-dimensional distribution of the ions at different mass-to-charge ratios.

It should be noted that the previous embodiments are mere examples of the present invention, and any change, modification, addition or the like appropriately made within the spirit of the present invention in any respect other than the already described ones will also evidently fall within the scope of claims of the present application.

REFERENCE SIGNS LIST

1 . . . Comprehensive Two-Dimensional LC Unit
2 . . . Mass Spectrometer
3 . . . Internal Standard Substance Adder
4, 7 . . . Data Processing Unit
41 . . . Spectrum Data Collector
42 . . . Mass Calibrator
43 . . . Mass Calibration Information Collector
44, 73 . . . Three-Dimensional Display Information Creator
71 . . . SIM Data Collector
72 . . . Signal-Intensity-Value Difference Calculator
5 . . . Input Unit
6 . . . Display Unit

The invention claimed is:

1. An analyzing device configured to obtain, for one sample, signal intensity values as analysis data by performing an analysis on each of micro areas on an N-dimensional space which is either a virtual space or a real space (where N is an integer equal to or greater than two), comprising:
   a) an error information collector configured to collect, during an execution of an analysis at each of the micro areas, an error quantity for each micro area related to an analysis or correction information for each micro area for correcting the error quantity; and
   b) a graph creator configured to create a graph showing a distribution of the error quantity based on the error quantity or correction information at each micro area collected by the error information collector, within an N+1 dimensional space formed by adding an axis representing the error quantity or correction information to N axes forming the N-dimensional space, and configured to display the graph on a screen of a display unit.

2. The analyzing device according to claim 1, wherein: the analysis data at each micro area are data obtained by a comprehensive two-dimensional gas chromatograph or comprehensive two-dimensional liquid chromatograph using a mass spectrometer as a detector; two axes of a two-dimensional space with N having a value of 2 both represent retention times; and a third axis represents a discrepancy in mass-to-charge ratio or correction information for correcting the discrepancy.

3. The analyzing device according to claim 1, wherein: the analysis data at each micro area are data obtained by a comprehensive two-dimensional gas chromatograph or comprehensive two-dimensional liquid chromatograph using a mass spectrometer as a detector; two axes of a two-dimensional space with N having a value of 2 both represent retention times; and a third axis represents a discrepancy in retention time or correction information for correcting the discrepancy.

4. The analyzing device according to claim 1, wherein: the analysis data at each micro area are data obtained by an imaging mass spectrometer; two axes of a two-dimensional space with N having a value of 2 are position information in different directions on a sample; and a third axis represent a discrepancy in mass-to-charge ratio or correction information for correcting the discrepancy.

5. An analyzing device configured to obtain, for a sample, signal intensity values as data by performing an analysis on each of micro areas on an N-dimensional space which is either a virtual space or a real space (where N is an integer equal to or greater than two), comprising:
   a) a difference information acquirer configured to calculate, for a plurality of samples or for a plurality of components in one sample, difference information for each of the micro areas, the difference information showing a difference in the signal intensity value obtained by the analysis at each of the micro areas or a difference in a physical quantity or statistical quantity obtained from the signal intensity values by a predetermined computation; and
   b) a graph creator configured to create a graph showing a distribution of the difference in the signal intensity value or the difference in the physical quantity or statistical quantity based on the difference information calculated for each micro area by the difference information acquirer, within an N+1 dimensional space formed by adding an axis representing the difference information to N axes forming the N-dimensional space, and configured to display the graph on a screen of a display unit.

* * * * *